(12) United States Patent
Park et al.

(10) Patent No.: US 8,174,236 B2
(45) Date of Patent: May 8, 2012

(54) BATTERY CHARGING DEVICE AND BATTERY WITH THE SAME

(75) Inventors: Jae-Yong Park, Suwon-si (KR); Yong-Beom Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 891 days.

(21) Appl. No.: 12/194,852

(22) Filed: Aug. 20, 2008

(65) Prior Publication Data

US 2009/0051316 A1 Feb. 26, 2009

(30) Foreign Application Priority Data

Aug. 24, 2007 (KR) .................. 10-2007-0085782

(51) Int. Cl.
*H02J 7/00* (2006.01)
*F21L 4/00* (2006.01)
*H01M 6/42* (2006.01)
*H01M 6/46* (2006.01)

(52) U.S. Cl. ........ 320/113; 320/111; 320/112; 320/114; 320/115; 320/107; 362/183; 429/98; 429/151; 429/153; 429/154

(58) Field of Classification Search .................. 320/113
See application file for complete search history.

(56) References Cited

U.S. PATENT DOCUMENTS

| 4,076,787 | A | * | 2/1978 | Ervin et al. ................... 264/250 |
| 5,721,481 | A | * | 2/1998 | Narita et al. ................... 320/111 |
| 6,831,443 | B2 | * | 12/2004 | Liu ................................ 320/113 |
| 2005/0156561 | A1 | * | 7/2005 | Yu et al. ........................ 320/107 |

FOREIGN PATENT DOCUMENTS

| CN | 2646934 | * | 6/2004 |
| CN | 2646934 | | 10/2004 |

OTHER PUBLICATIONS

First Office Action issued Mar. 1, 2010 in counterpart Chinese Application No. 200810213318.2.

* cited by examiner

*Primary Examiner* — Yalkew Fantu
(74) *Attorney, Agent, or Firm* — H.C. Park & Associates, PLC.

(57) ABSTRACT

A battery charging device includes a power terminal unit to be connected to a power source and provided with power therefrom, a charging terminal unit to be connected to a power terminal of a battery, and a holding device to be fixed to side faces of the battery when the charging terminal unit contacts the power terminal of the battery.

13 Claims, 7 Drawing Sheets

BATTERY CHARGING DEVICE AND BATTERY WITH THE SAME

CROSS REFERENCE TO RELATED APPLICATION

This application claims priority from and the benefit of Korean Patent Application No. 10-2007-0085782, filed on Aug. 24, 2007, which is hereby incorporated by reference for all purposes as if fully set forth herein.

BACKGROUND OF THE INVENTION

1. Field of the Invention

The present invention relates generally to a battery charging device and a battery using the same, and in particular, to a battery charging device that may be connected to a charger to charge a battery and to a power terminal of a battery to charge the battery, and a battery using the same. The battery charging device is adapted to be coupled to batteries having various thicknesses and shapes.

2. Discussion of the Background

Generally, in order to drive an electronic device, the power appropriate for the specific electronic device should be supplied. In particular, a portable electronic device, such as portable terminal, MP3 player, or a Portable Multimedia Player (PMP), has its own battery for to supply power thereto. The battery may be classified as a sliding type or a locking type according to its way to be coupled to the portable electronic device. With the recent trends toward slimness and minimization of portable electronic devices, the so-called built-in type is mainly used. In the built-in type, the entire battery is accommodated in a battery holder of the portable electronic device's housing to provide high space utilization. When the battery is discharged, the user separates the battery from the battery holder of the portable electronic device, and recharges it using a charger.

FIG. 1 is a perspective view showing a conventional structure for charging a battery when the battery is separated from an electronic device.

As shown in FIG. 1, a battery-only case 20 is provided to charge a discharged battery 10 that is separated from the electronic device. The battery-only case 20 includes a case 21 and a cover 22. The case 21 has a connection socket 23 to connect the battery 10 to a connection terminal 31 of a charger 30 when the battery 10 is inserted into the case 21, and the cover 22 is formed to cover one end of the case 21 into which the battery 10 is inserted. The battery 10, when discharged, may be separated from the electronic device and then recharged. The battery 10 is inserted inside the case 21 through one end of the case 21 so that a charging terminal 11 of the battery 10 may be engaged with the connection socket 23 of the case 21. After inserting the battery 10 through one end of the case 21, the user can cover the end of the case 21 into which the battery 10 is inserted, with the cover 22. In this state, the connection terminal 31 of a charger 30 is inserted into the case 21 so that it is engaged with the connection socket 23 included in the case 21. Accordingly, the battery 10 may be connected to the charger 30 via the connection socket 23 of the case 21, and recharged. A conventional battery 10 may have a high-capacity size, a standard-capacity size, or a low-capacity size according to its drive power to drive the electronic device. As described, however, in order to charge a different battery 10, a battery-only case 20, which corresponds to the size of the battery 10, is needed, and it may not be possible to charge a battery 10 without the battery-only case 20 corresponding to the size of the battery 10.

SUMMARY OF THE INVENTION

The present invention provides a battery charging device to easily charge a battery without a battery-only case.

The present invention also provides a battery charging device that may be coupled to batteries of various shapes regardless of the shape and/or size of the batteries.

The present invention also provides a battery that may include a battery charging device.

Additional features of the invention will be set forth in the description which follows, and in part will be apparent from the description, or may be learned by practice of the invention.

The present invention discloses a battery charging device including a power terminal unit to be connected to a power source, a charging terminal unit to be connected to a power terminal of a battery, and a holding device to be fixed to side faces of the battery when the charging terminal unit contacts the power terminal of the battery.

The present invention also discloses a battery including a plate-type battery body in which a battery cell is embedded, a power terminal to charge the battery cell, and a pair of fixing portions. The power terminal is attached to a surface of the battery body, and the fixing portions are disposed at respective side faces of the power terminal. The fixing portions are adapted to be coupled to a battery charging device.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
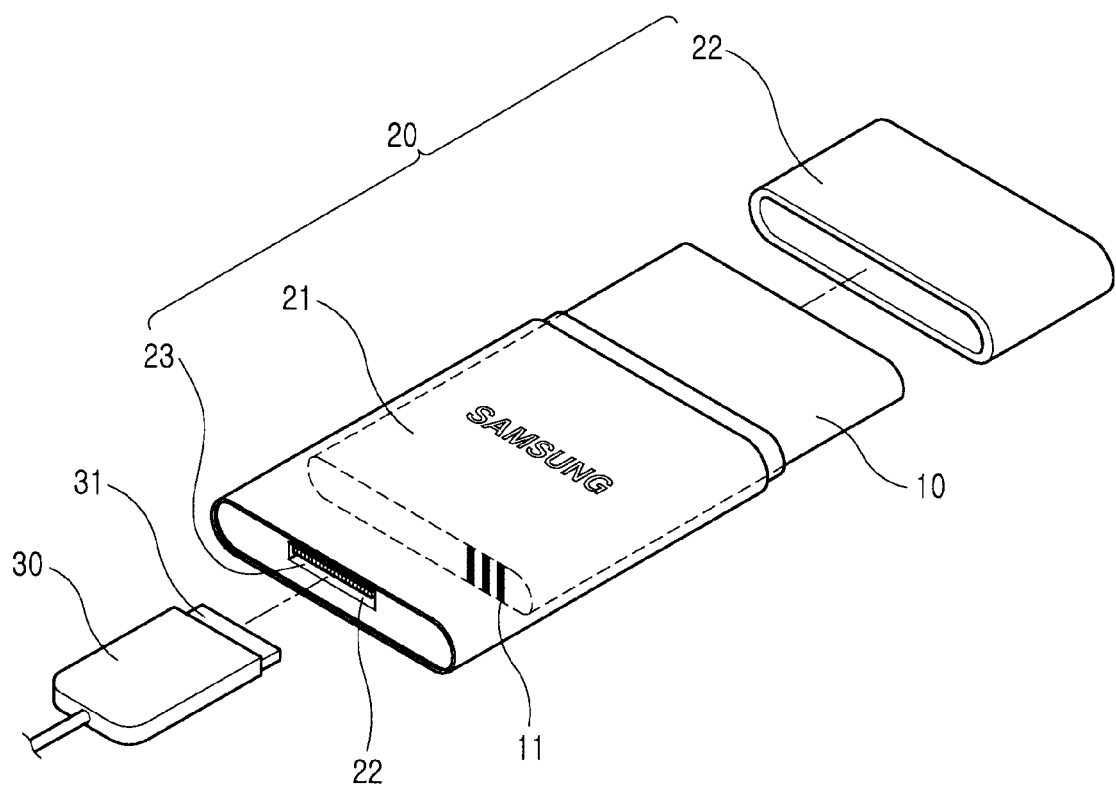
FIG. 1 is a perspective view showing a structure in which a battery is coupled to a battery-only case to charge the battery according to the prior art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present.

Figure 2:
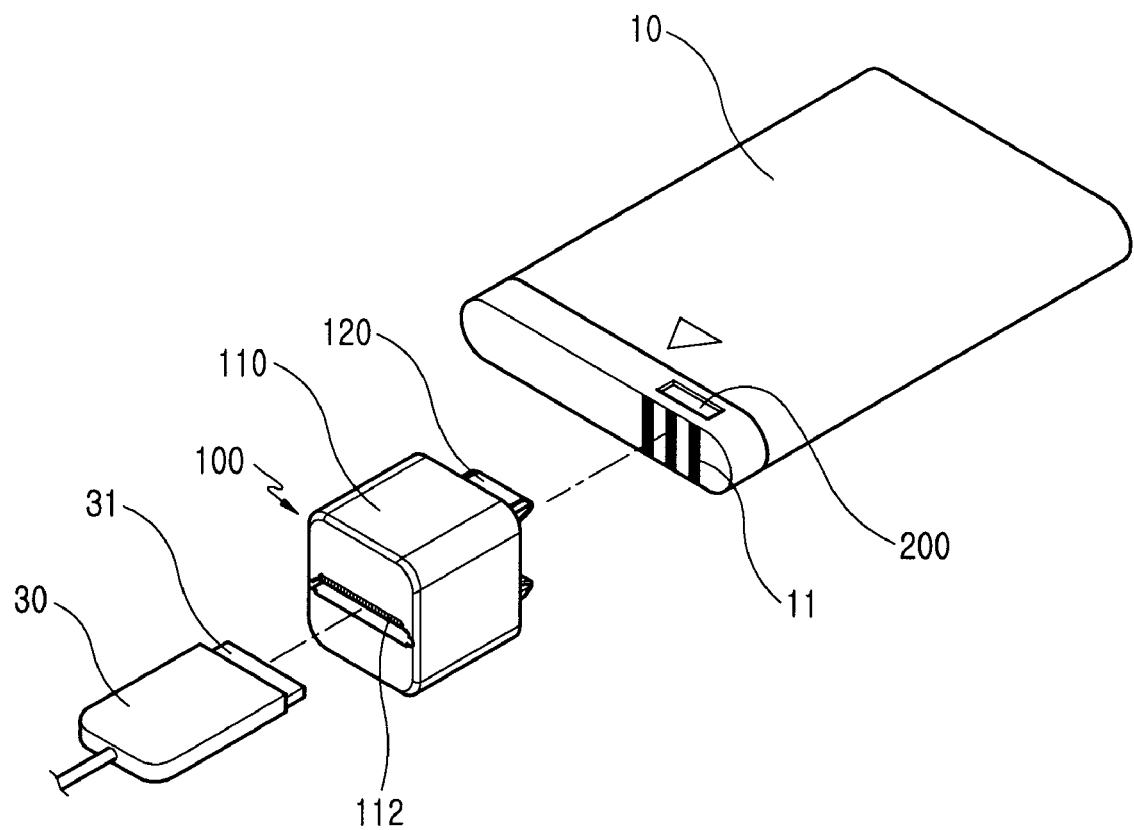
FIG. 2 is a perspective view showing a structure of a battery charging device and a battery with the same according to an exemplary embodiment of the present invention.
Figure 3:
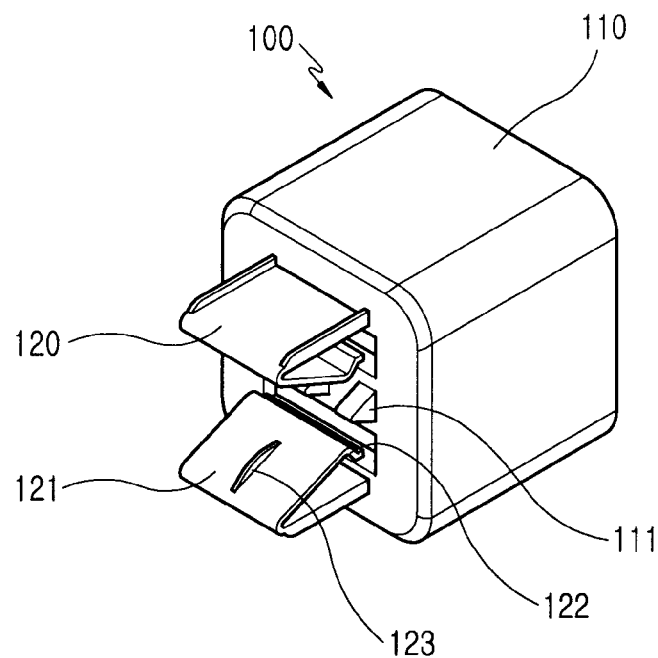
FIG. 3 is a perspective view showing a connection switching device in which a holding device is protrudently formed according to an exemplary embodiment of the present invention.
Figure 4:
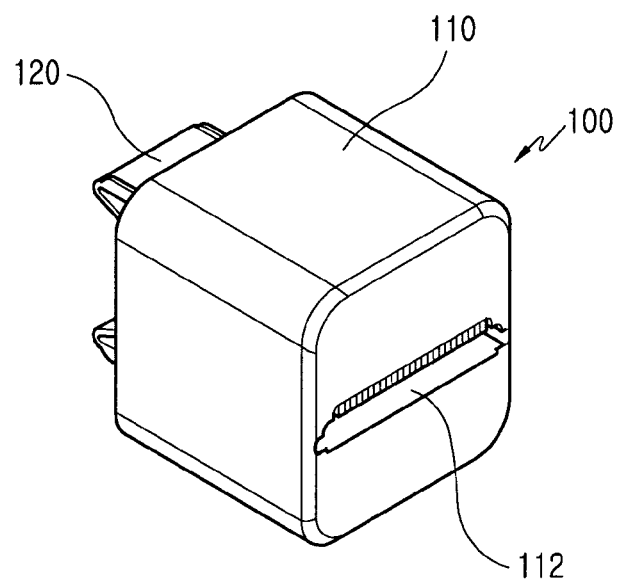
FIG. 4 is a perspective view showing a charger's connection terminal according to an exemplary embodiment of the present invention.
Figure 5:
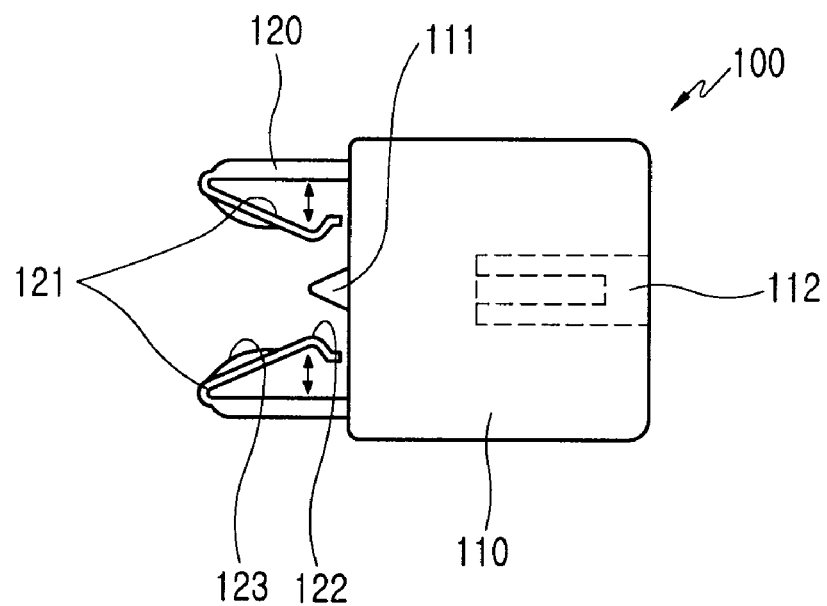
FIG. 5 is a side view showing a battery charging device according to an exemplary embodiment of the present invention.
Figure 6:
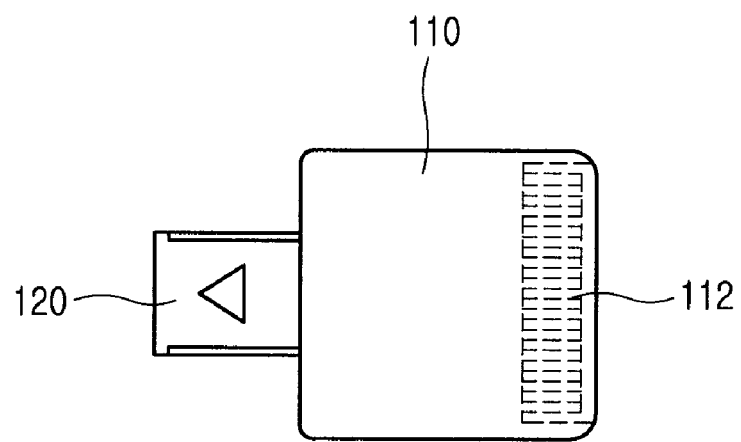
FIG. 6 a top view showing a battery charging device according to an exemplary embodiment of the present invention.
Figure 7:
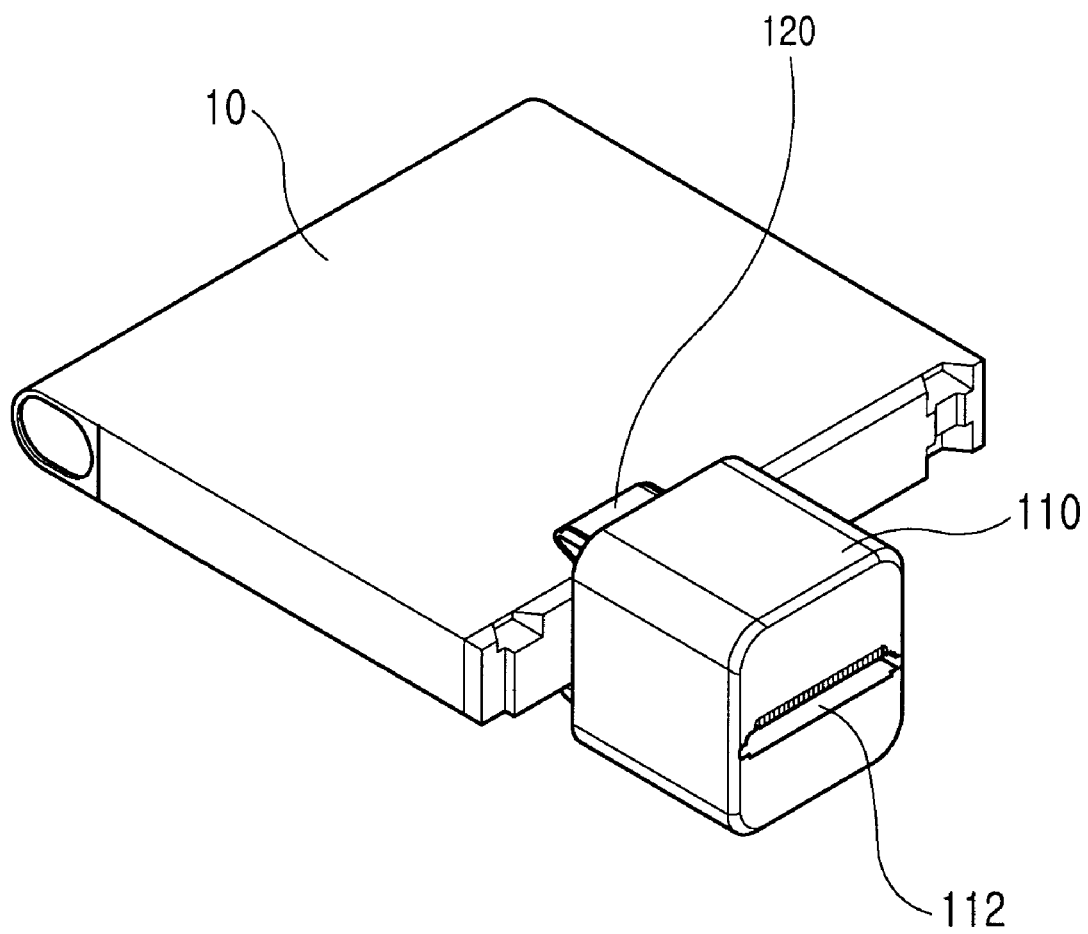
FIG. 7 is a perspective view showing a state in which a battery charging device is coupled to a battery according to an exemplary embodiment of the present invention.
Figure 8:
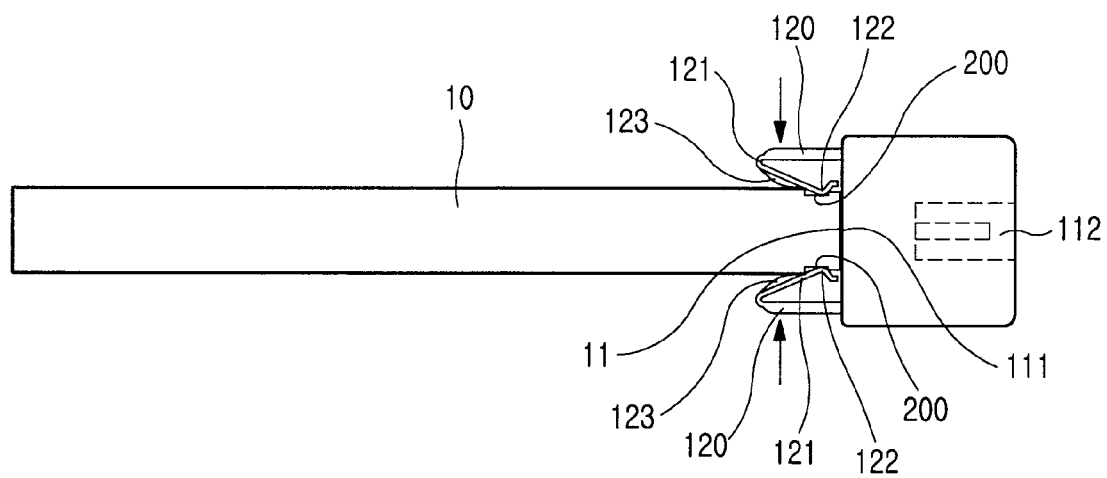
FIG. 8 is a side view showing a state in which a battery charging device is coupled to a battery according to an exemplary embodiment of the present invention.
Figure 10:
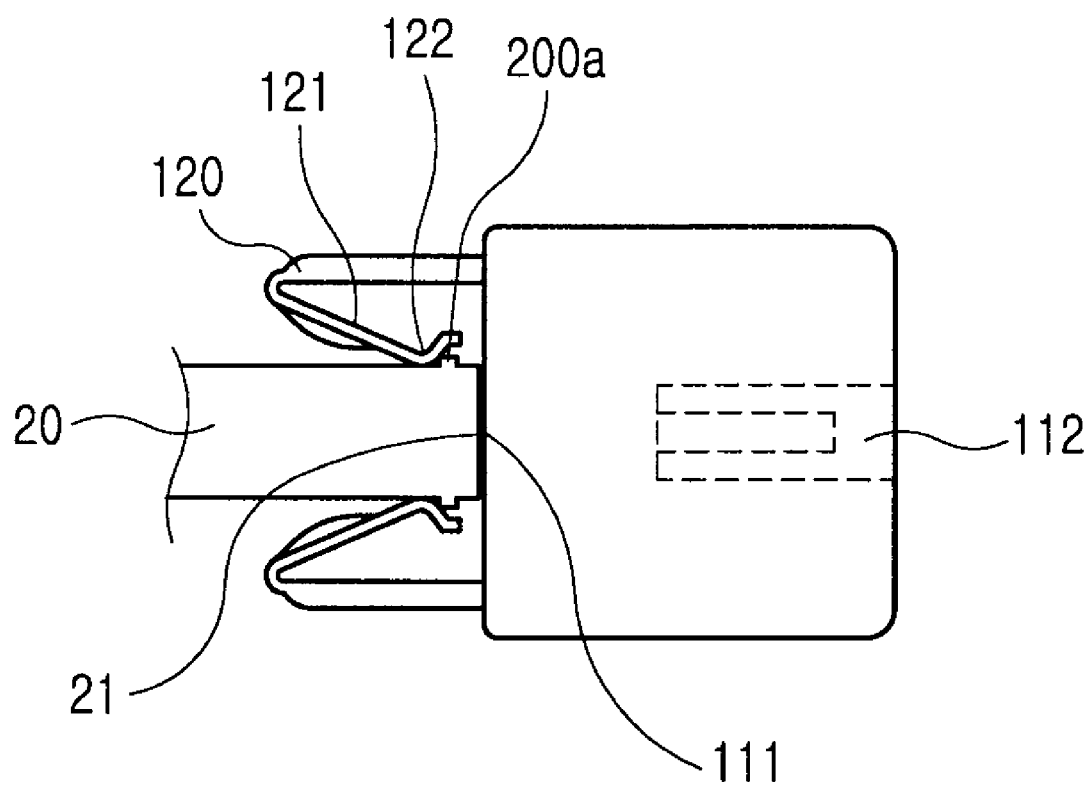
FIG. 10 is a side view showing an alternative fixing portion of a battery according to an exemplary embodiment of the present invention.

As shown in FIG. 2, FIG. 3, FIG. 4, FIG. 5, FIG. 6, FIG. 7, and FIG. 8, a battery charging device 100 includes a power terminal unit 112, a charging terminal unit 111, and a holding device. The power terminal unit 112 is connected to a charger 30 to receive power therefrom. The charging terminal unit 111 is connected to a power terminal 11 of a battery 10 to receive the power therefrom. The holding device is fixed to both sides of the battery 10 when the charging terminal unit 111 contacts the power terminal 11 of the battery 10. As shown in FIG. 3, FIG. 5, FIG. 7, and FIG. 8, the holding device is composed of two leaf springs 120, and the leaf springs 120 are provided to face each other and are elastically bent up and down to hold the battery 10 when the battery 10 is coupled with the battery charging device 100. As shown in FIG. 3, FIG. 5, FIG. 7, and FIG. 8, an inner side of each leaf spring 120 includes an elastic plate 121, and the elastic plates 121 extend at angles toward each other such that they may be elastically bent up and down to hold the battery 10 according to the shape of the battery 10 when the battery 10 is coupled to the battery charging device 100. As shown in FIG. 3, FIG. 5, FIG. 7, and FIG. 8, the leaf springs 120 hold the battery 10 so that it is engaged with the charging terminal unit 111 by providing an elastic force toward the battery 10 when the elastic plate 121 of the leaf springs 120 are pushed away from each other while contacting the respective ends of the battery 10. As shown in FIG. 3, FIG. 5, and FIG. 8, the leaf spring 120 includes a locking portion 122, and the locking portion 122 is provided on the leaf spring 120 to restrain the battery 10 or release the restraint during attachment/detachment of the battery 10. As shown in FIG. 2, FIG. 3, FIG. 5, and FIG. 8, the locking portion 122 protrudes from the leaf spring 120, and a fixing portion 200 is formed on each end of the battery 10 to attach/detach the locking portion 122. As shown in FIG. 2, FIG. 7, and FIG. 8, the leaf springs 120 include separation devices 123 that protrude in directions perpendicular to the respective elastic plates 121 so as to separate the locking portion 122 coupled to the fixing portion 200. As shown in FIG. 8, if force is applied to the leaf spring 120 when the locking portion 122 is coupled to the fixing portion, the separation device 123 contacts the battery 10, and moves the leaf spring 120 in the up/down direction to separate the locking portion 122 from the fixing portion. As shown in FIG. 8 and FIG. 10, the fixing portion may include a groove 200 or a protrusion portion 200a.

With reference to FIG. 2, FIG. 3, FIG. 4, FIG. 5, FIG. 6, FIG. 7, and FIG. 8, a detailed description will now be made of an operation of the above-stated battery charging device according to an exemplary embodiment of the present invention. As shown in FIG. 2, FIG. 7, and FIG. 8, in order to charge the battery 10, the battery charging device 100 is coupled to the battery 10 and the main body 110 of the battery charging device 100 is coupled to the charger 30.

As shown in FIG. 2, the battery 10 is inserted between the leaf springs 120 protruding on the main body 110 so that the charging terminal 11 of the battery 10 can contact the charging terminal unit 111 of the main body 110. As shown in FIG. 8, locking portions 122 of the leaf springs 120 are inserted into the grooves 200 of the battery 10 to hold the battery 10 between the leaf springs 120. As shown in FIG. 5 and FIG. 8, when the leaf springs 120 are inserted into the grooves 200, the ends of the battery 10 contact and push against the inner sides of elastic plates 121 of the leaf springs 120.

The inner sides of elastic plates 121 of the leaf springs 120 are elastically pushed and moved in an up/down direction due to a pushing force exerted by the ends of the battery 10. Accordingly, the space between the leaf springs 120 increases according to the distance between the ends of the battery 10 so that the battery 10 may be inserted between the leaf springs 120. After the locking portions 122 of the leaf springs 120 are inserted into the fixing portion 200 of the battery 10, the locking portion 122 is guided and moved while contacting the battery 10 so that the power terminal 11 of the battery 10 contacts the charging terminal unit 111. When the battery 10 is between the leaf springs 120, the leaf springs 120 elastically push on the battery 10, and the battery 10 is held between the leaf springs 120 by the elastic force.

In this state, as shown in FIG. 8, the locking portion 122 is inserted into the groove 200 due to the elastic force. Accordingly, the leaf springs 120 may provide a click feeling when they are coupled to the battery 10. In addition, when the locking portions 122 are coupled to the grooves 200, the charging terminal unit 111 is connected to the power terminal 11 of the battery 10. If the connection terminal 31 of the charger 30 is inserted into the power terminal unit 112, which is situated in the battery charging device 100 in the vicinity of the charging terminal unit 111, the battery 10 may be charged by the battery charging device 100.

After charging the battery 10, in order to separate the battery charging device 100 from the battery 10, the user may apply force to both sides of the battery 10 at outer sides of the leaf springs 120 as shown in FIG. 8. When this force is applied to the outer sides of the leaf springs 120 and toward the battery 10, the separation devices 123, which protrude\from the elastic plates 121 of the leaf springs 120, contact the battery 10. When the separation devices 123 contact the battery 10, the battery 10 moves the locking portions 122 in an up/down direction centering on their associated separation devices 123 using a lever principle or a seesaw principle, thereby separating the locking portions 122 from the grooves 200.

In this state, if the user may pull the battery 10 away from the battery charging device 100 to separate the battery 10 from the battery charging device 100. If the distance between the ends of the battery 10 coupled between the leaf springs 120 changes because a battery 10 of a different size is to be charged, the leaf springs 120 elastically move in an up/down direction so that the battery 10 of a different size may be inserted between the leaf springs 120. Thus, it may be possible to insert batteries 10 of various shapes between the leaf springs 120 by changing the distance between the leaf springs 120 according to the thickness or shape of the battery 10. In addition, when coupling the battery 10 to the battery charging device 100, it may be possible to provide a click feeling to the user due to the locking portions 122, which are attached and detached to/from their associated grooves 200, and also to guide the battery charging device 100 into the coupling position.

As shown in FIG. 10, in another exemplary embodiment, the fixing portion may include a protrusion portion 200a. In this case, the leaf springs 120 may be coupled to the battery 10 by the protrusion portions 200a so that the battery charging device 100 is attached to the battery 10. The leaf springs 120 are elastically pushed up and down by the protrusion portions 200a. and spaced apart from each other by the distance between ends of the battery 10 so that the battery 10 may be inserted thereinto. The protrusion portion 200a fits between the locking portion 122 and one side of the main body 110. Accordingly, the locking portions 122 are hooked and restrained by respective protrusion portions 200a, and the battery 10 is held between the leaf springs 120. The battery 10 may be charged by connecting the electric power to the power terminal unit 112 of the main body 110. After charging the battery 10, the user may pull the main body 110 away from the battery charging device 100 while applying force to both ends of the battery 10 at outer sides of the leaf springs 120 in order to separate the battery charging device 100 from the battery 10. Thus, when the separation devices 123 contact the battery 10, the locking portions 122 move in an up/down direction due to the protrusion portions 200a. In this state, if the user pulls the battery 10 away from the battery charging device 100, the leaf springs 120 re separated from the battery 10. In this manner, it may be possible to couple batteries 10 of various shapes to the battery charging device 100 by changing the space between the leaf springs 120 of the battery charging device 100 according to the thickness or shape of the battery 10.

Figure 9:
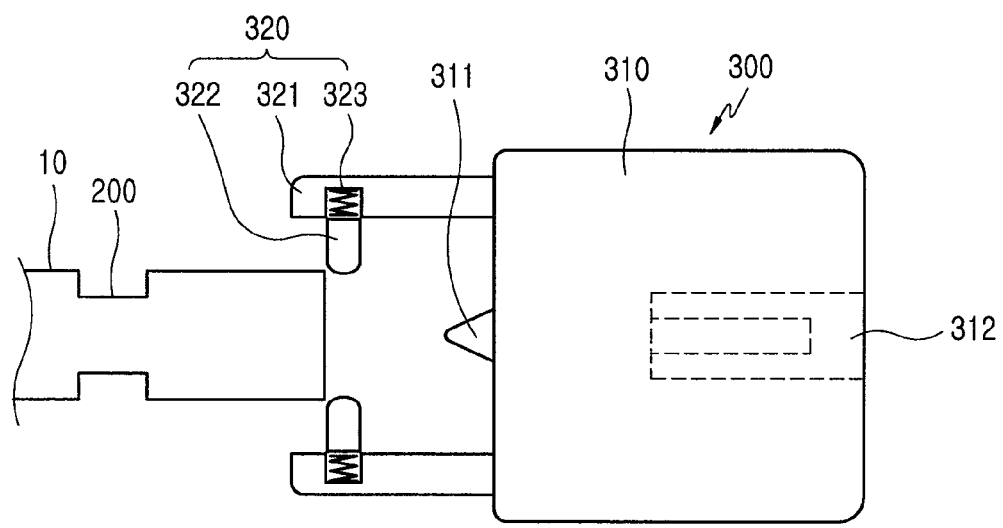
FIG. 9 is a side view showing an alternative structure of a holding device in a battery charging device according to an exemplary embodiment of the present invention.

With reference to FIG. 9, a detailed description will now be made of the operation of a battery charging device based on an alternative holding device according to an exemplary embodiment of the present invention.

As shown in FIG. 9, a holding device 320 of a battery charging device 300 includes a pair of plates 321, a pair of locking members 322, and a pair of elastic members 323. The plates 321 protrude from a main body 310 to face each other. The locking members 322 are provided on the plates 321 such that when the battery 10 is coupled to the plates 321, they engage and restrain the battery 10 or release the restraint during detachment of the battery 10 by moving up and down. The elastic members 323 are provided between the locking members 322 and the plates 321 to provide an elastic force to enable the up/down movement of the locking members 322. As shown in FIG. 9, the locking members 322 each include a locking member 322 projecting therefrom, and the locking members 322 protrude toward each other in a direction perpendicular to the longitudinal direction of the plates 321 so that they can move up and down when the battery 10 is being coupled to or detached from the battery charging device 100. In FIG. 9, grooves 200 are formed on the battery 10 so that the locking members 322, which may be projections extending from the elastic members 323, may be inserted thereinto, and because the locking members 322 are inserted into the grooves 200, the charging terminal unit 311 may be connected and coupled to the power terminal 11 of the battery 10. The elastic members 323 may include a coil springs.

Due to this structure, if the holding device 320 is coupled to the battery 10, the ends of the battery 10 contact respective locking members 322, thereby pushing them away from each other. The elastic members 323 formed between the locking members 322 and the plates 321 are compressed by a pushing up force caused by the locking members 322, and the locking members 322 move in the up/down direction. The compression of the elastic members 323 applies an elastic force from the locking members 322 toward the battery 10. Therefore, when the battery 10 is inserted into the holding device 320, it engages with the locking members 322. When the locking members 322 are situated on the grooves 200, the locking members 322 are inserted into the grooves 200 due to the elastic force of the elastic members 323. As the locking members 322 are inserted into the grooves 200, the charging terminal unit 311 of the battery body 310 contacts the charging terminal 11 of the battery 10. If the user pulls the battery charging device 300 away from the main body housing 310 in order to separate it, the locking grooves 200 contact the locking members 322, thereby pushing the locking members 322. The elastic members 323 are compressed due to the pushing force of the locking members 322, and the space between locking members 322 increases, thereby allowing the battery 10 to be removed. As the space between the locking members 322 elastically changes according to the size or shape of the battery 10, batteries 10 of various shapes can be inserted between the locking members 322. During the coupling of the battery 10 to the battery charging device 300, the locking members 322 that are attached and detached to/from the locking grooves 200 may provide a click feeling to the user, and also may guide the battery charging device 300 according to its coupling position.

With reference to FIG. 10, a detailed description will now be made of the battery having the above-stated battery charging device according to an exemplary embodiment of the present invention. A battery 20 includes a battery body 20, a power terminal 21 to charge the battery 20, fixing portions including protrusions 200a, and a battery charging device 100. The battery body 20 is a plate-type battery body in which a battery cell is embedded, and the power terminal 21 to charge the battery 20 is attached to a surface of the battery body 20. Protrusions 200a are formed at each side of the attachment surface of the power terminal 11, and the battery charging device 100 is fixed to the protrusions 200a.

As is apparent from the foregoing description, the battery charging device according to exemplary embodiments of the present invention may charge batteries having various thicknesses and shapes, which may make it possible to charge various batteries with a single battery-only case. In addition, the battery charging device may be coupled to the batteries regardless of their thickness or shape due to the holding devices, thereby allowing the user to charge the battery. Further, the battery charging device and a device to connect the charging terminal of the battery to the connection terminal of the charger may be miniaturized, thereby allowing the users to carry it with them as an accessory for electronic devices.

The size or shape of one face of the main body housing in which the holding device is formed may be freely changed taking into account the distance between the holding devices. In addition, the fixing portions to restrain the battery charging device or release the restraint may include any one of protrusions and grooves, which may have any shape that will restrain the battery charging device or release the restraint by hooking the locking portions are available as the fixing portions. Further, the holding portion may alternatively include tongs and the tips of the tongs may include rubber. The battery charging device may be applied to all devices that can be held by the electronic devices.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A battery charging device, comprising:
   a power terminal unit to be connected to a power source;
   a charging terminal unit to be connected to a power terminal of a battery; and
   a holding device to be fixed to side faces of the battery when the charging terminal unit contacts the power terminal of the battery,
   wherein the holding device comprises two leaf springs provided to face each other and elastically move in an up/down direction, the two leaf springs to hold the battery when the battery is connected with the battery charging device.

2. The battery charging device of claim 1, wherein inner sides of the leaf springs each extend at angles toward each other and comprise an elastic plate that elastically moves in the up/down direction according to a shape of the battery that is to be connected with the battery charging device.

3. The battery charging device of claim 2, wherein the leaf springs are pushed away from each other when they contact respective ends of the battery, thereby applying an elastic force toward the battery to hold the battery in the holding device.

4. The battery charging device of claim 1, wherein each leaf spring comprises a locking portion to restrain the battery and to release the restraint during attachment/detachment of the battery.

5. The battery charging device of claim 4, wherein the locking portion protrudes from the leaf springs, and at least one fixing portion to attach/detach the locking portion is disposed at each end of the battery.

6. The battery charging device of claim 5, wherein separation devices protrude from inner surfaces of the leaf springs to separate the locking portions coupled to the fixing portions, and
   wherein the leaf springs move in the up/down direction as the separation devices contact the battery, thereby separating the locking portions from the fixing portions when force is applied to the leaf springs while the locking portions are coupled to the fixing portions.

7. The battery charging device of claim 5, wherein the fixing portion comprises at least one of a groove and a protrusion.

8. The battery charging device of claim 1, wherein the holding device further comprises tongs, wherein tips of the tongs comprise rubber.

9. A battery charging device, comprising:
   a power terminal unit to be connected to a power source;
   a charging terminal unit to be connected to a power terminal of a battery; and
   a holding device to be fixed to side faces of the battery when the charging terminal unit contacts the power terminal of the battery,
   wherein the holding device comprises:
   a pair of plates that protrude from a main body housing to face each other;
   at least one locking member disposed on the plates, the at least one locking member moving up and down when the battery is coupled to the plates to engagingly restrain the battery or release the restraint during detachment thereof; and
   at least one elastic member provided between the locking member and the plates, the at least one elastic member to provide elastic force to move the locking member.

10. The battery charging device of claim 9, wherein the locking members protrude in a direction perpendicular to a longitudinal direction of the plates, and each locking member comprises a projection that moves up and down when the battery is combined with the battery charging device.

11. The battery charging device of claim 10, wherein at least one fixing portion is disposed on the battery and the projection is inserted into the fixing portion to connect the charging terminal unit to the battery's power terminal.

12. The battery charging device of claim 11, wherein the fixing portion comprises one of a groove and a protrusion.

13. The battery charging device of claim 9, wherein the elastic member comprises a coil spring.

* * * * *